United States Patent [19]
Urai et al.

[11] 4,096,014
[45] Jun. 20, 1978

[54] METHOD OF MANUFACTURING CUSHION MATERIALS

[75] Inventors: Muneharu Urai; Koji Kogure; Youichiro Haraguchi, all of Tokyo, Japan

[73] Assignee: Takeji Saito, Tokyo, Japan

[21] Appl. No.: 801,731

[22] Filed: May 31, 1977

Related U.S. Application Data

[62] Division of Ser. No. 610,175, Sep. 4, 1975, Pat. No. 4,044,715.

[30] Foreign Application Priority Data

Sep. 17, 1974  Japan .................................. 49-105981

[51] Int. Cl.² ........................ B29C 19/04; B32B 31/00
[52] U.S. Cl. ...................................... 156/273; 156/283
[58] Field of Search ............................. 156/272.3, 283

[56] References Cited

U.S. PATENT DOCUMENTS 3,393,119   7/1968   Dugan ................................. 156/273
3,906,134   9/1975   Pohl .................................... 156/273

Primary Examiner—Douglas J. Drummond
Attorney, Agent, or Firm—Oldham, Oldham, Hudak & Weber Co.

[57] ABSTRACT

A method of manufacturing a cushion material by applying high frequency welding to a sandwich consisting of a core layer of foamed material, a surface material layer and a backing material layer, in which a fine powdery welding material is previously injected or impregnated in desired weld areas of the foamed material layer. The method comprises floating the fine powdery welding material in the form of a cloud, and blowing up the fine powdery welding material floating in cloud-like form to impregnate the desired areas of the foamed material layer with the fine powdery welding material.

7 Claims, 5 Drawing Figures

METHOD OF MANUFACTURING CUSHION MATERIALS

CROSS REFERENCE

This is a divisional application from prior application Ser. No. 610,175, filed Sept. 7, 1975 now U.S. Pat. No. 4,044,715.

This invention relates to a method of manufacturing cushion materials by applying high frequency welding to a sandwich structure consisting of a core layer of foamed material, a surface material layer and a backing material layer covering the opposite surfaces of the core layer, and more particularly to a method of and apparatus for injecting or impregnating a fine powdery welding material into the foamed material core layer of the sandwich structure.

As is commonly known, the surfaces of seats and other parts in automobiles are generally covered with a covering consisting of a vinyl coated fabric or like surface material layer and a foamed material layer integrally welded together at suitable portions in order to provide a cushion effect to such surfaces. Such a two-layer structure, or a three-layer structure including an additional backing material layer, is widely used not only for covering the seat surface and other surfaces above described but also for various other commercial applications including beds, furniture, wall members and clothing.

However, welding of a foamed material such as polyurethane foam structure to a surface material such as a vinyl coated fabric at desired areas has not been fully successful in many cases due to the fact that the melting point of the polyurethane is higher than that of the vinyl compound. Especially, great difficulty has been encountered in the welding of a backing material layer and a surface material layer to a foamed material layer in a sandwich form due to the fact that these three layers cannot be satisfactorily welded together since the foamed material layer is not softened when heating such as high frequency heating is carried out at a temperature close to the melting point of the surface material, and that the surface material tends to be completely molten and flow out when heating is carried out at temperature close to the melting point of the foamed material.

In an attempt to obviate the above difficulty, a method was proposed according to which a welding material having a relatively low melting point is injected or impregnated into local areas of the foamed material so that this injected or impregnated welding material can be utilized for the desired welding of the two layers or three layers together at a temperature equivalent substantially to the softening temperature of the surface material. The welding material was initially prepared by dissolving nylon or vinyl chloride resin in a solvent such as an alcohol or ether. However, when a plan fabric such as tricot is used as the surface material, the strength of adhesion by high frequency welding with a conventional vinyl chloride resin impregnated polyurethane foamed material is weak and apt to peal off. It has been found that direct injection or impregnation of fine powdery nylon or vinyl chloride resin into the foamed structure of the foamed material is better than the former means for the purpose of avoiding undesirable hardening of the areas around the welded portions and can thus be preferably used for the welding purpose.

However, it has been difficult to automatically, mechanically and continuously inject or impregnate the fine powdery welding material into cells of the foamed material, and manual operation has been generally resorted to heretofore for the injection or impregnation of the fine powdery welding material into the cells. This manual operation has however been disadvantageous in that considerable skills are required in order to attain uniform injection or impregnation of the fine powdery welding material into the cells of the foamed material.

The present invention contemplates the provision of a novel and improved method in which such a process is fully automated.

It is a primary object of the present invention to provide a method of manufacturing a cushion material by applying high frequency welding to a sandwich structure consisting of a surface material layer and a backing material layer covering the opposite surfaces of a core layer of foamed material impregnated previously with a fine powdery welding material at predetermined spaced areas thereof, wherein said fine powdery welding material is floated in a cloud-like layer and is then blown up from the cloud-like floating layer to be injected into the predetermined spaced areas of said foamed material.

Another object of the present invention is to provide a method of the above character, wherein said foamed material layer impregnated locally with said fine powdery welding material is fed into a heat-setting furnace to be heat-set in the continuous cell structure of said foamed material.

Still another object of the present invention is to provide a method of the above character, wherein a layer of surface material embossed at its predetermined zone by embossing means and a layer of backing material are superimposed on the opposite surfaces respectively of said foamed material layer impregnated locally with said fine powdery welding material, and said foamed material layer of this sandwich structure is welded to the surface material layer and backing material layer by a high frequency welder at the areas impregnated with said fine powdery welding material.

Yet another object of the present invention is to provide a method of the above character, wherein the step of heat-setting is eliminated, and the portion of said fine powdery welding material which did not participate in the welding is collected by air under positive or negative pressure after the step of high frequency welding.

A further object of the present invention is to provide an apparatus for manufacturing a cushion material including a hollow body, a table disposed on said body and formed with apertures of predetermined shape, a hollow upper cover member movable toward and away from said table, and a plate closing the lower end opening of said upper cover member and formed with apertures of the same shape as that of said apertures of said table and aligning with the latter, said table and said plate being adapted to hold a sheet of foamed material of continuous cell structure therebetween during impregnation of a fine powdery welding material into said foamed material through said aligned apertures, said apparatus comprising a porous member disposed within said body, means for supplying air under relatively low pressure from beneath said porous member thereby producing a cloud-like floating layer of said fine powdery welding material above said porous member, and conduit means extending into the zone of said cloud-like floating layer for jetting a gas under high pressure into said cloud-like floating layer thereby forcedly carrying said fine powdery welding material in said cloud-like floating layer toward said apertures of said table by the gas under high pressure.

Another object of the present invention is to provide an apparatus of the above character, wherein a net-like or grating-like oscillating member is disposed on said porous member for reciprocating movement relative to the latter and is oscillated to uniformalize the level of said fine powdery welding material accumulating on said porous member.

Still another object of the present invention is to provide an apparatus of the above character, wherein retractable shutter means is disposed beneath said table within said body.

Yet another object of the present invention is to provide an apparatus of the above character, wherein pressure imparting members protrude from the peripheral edges of the apertures of said table and said plate so as to make pressure engagement with the portions of said foamed material corresponding to the peripheral edges of said apertures when said foamed material is held between said table and said plate.

Another object of the present invention is to provide an apparatus of the above character, wherein another conduit for supplying said fine powdery welding material is disposed to extend beneath said high-pressure gas supplying conduit means.

Still another object of the present invention is to provide an apparatus of the above character, wherein a blow-away gas supplying conduit is disposed to extend above said plate for blowing away the portion of said fine powdery welding material which may accumulate on said plate.

Yet another object of the present invention is to provide an apparatus of the above character, further comprising a powdery welding material collecting conduit extending outwardly from the upper end of said upper cover member, a cyclone connected to said collecting conduit, a feed pump connected to the bottom of said cyclone for supplying the collected portion of said fine powdery welding material supplying conduit, and a hopper connected to said feed pump for making up a fresh supply of said fine powdery welding material.

In the present invention, the term "injection" or "impregnation" is used to designate uniform distribution of a fine powdery welding material into selected portions of a foamed material.

A preferred embodiment of the present invention will be described in detail with reference to the accompanying drawings.

Figure 1:
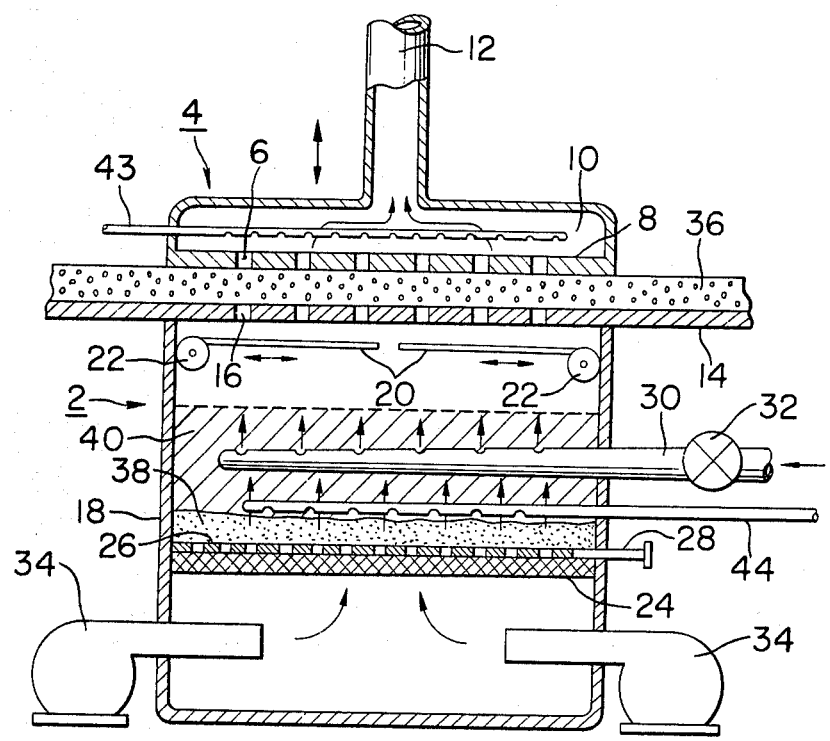
FIG. 1 is a vertical sectional view of an apparatus for impregnating a fine powdery welding material into a foamed material according to the present invention.

Referring to FIG. 1 showing a preferred embodiment of the apparatus of the present invention adapted for injecting or impregnating a fine powdery welding material into a foamed material layer, the reference numerals 2 and 4 designate a hollow body and a hollow upper cover member, respectively. The upper cover member 4 is adapted to make vertical movement toward and away from the upper end of the body 2. A horizontally extending table 14 is provided on the upper end of the body 2 and formed with apertures 16 which are formed in a shape of weld lines 66 shown in FIG. 5. The lower end opening of the upper cover member 4 is formed with a plurality of suitably spaced apertures 6 of the same shape as that of the apertures 16 and vertically aligning with the latter. The space 10 defined within the hollow upper cover member 4 communicates with a conduit 12 which is connected to powdery welding material collecting means described later with reference to FIG. 3.

The apertures 16 bored in the table 14 provided on the upper end of the body 2 are sized to conform to the configuration of desired weld areas (or desired weld lines) of a sheet of foamed material 36. A hollow casing 18 in the form of a box is mounted gas-tight to the lower surface of the table 14. A pair of retractable shutters 20 are disposed within the hollow casing 18 immediately beneath the table 14. The shutters 20 can be retracted into respective retractors 22 mounted on the opposite inner walls of the casing 18. In a position slightly beneath the center of the casing 18, a porous member is disposed to extend substantially horizontally. This porous member 24 is formed from a sintered alloy or vinyl material having a multiplicity of very fine continuous pores. A net-like or grating-like, planar shaped apertured oscillating member 26 is disposed on the upper surface of the porous member 24. This oscillating member 26 is provided with a handle 28 at the end portion projecting outside through the side wall of the casing 18, and this handle 28 is manually actuated or driven by a power source (not shown) so as to cause mechanical reciprocating movement of the oscillating member 26 on the stationary porous member 24.

A mass of fine powdery welding material 38 is supplied into the hollow casing 18 by a conduit 44. The oscillating member 26 acts to uniformalize the level of the fine powdery welding material 38 supplied into the casing 18 even when the fine powdery welding material 38 is supplied nonuniformly by the conduit 44. In a position substantially intermediate between the shutters 20 and the oscillating member 26 in the casing 18, high-pressure gas supply pipe 30 extends into the casing 18 and has its diameter gradually reduced toward the inner closed end terminating adjacent to the inner wall of the casing 18. A plurality of gas jetting nozzles are bored at predetermined intervals in the upper surface of the pipe 30. The end portion of the pipe 30 projecting to the exterior of the casing 18 is connected through a valve 32 to a source of gas under high pressure (not shown). The space portion of the casing 18 beneath the porous member 25 communicates with delivery ports of a pair of blowers 34 disposed opposite to each other. The reference numeral 43 designates a conduit for supplying air under pressure for blowing away the portion of the fine powdery welding material which may accumulate on the plate 8 so that such material can be collected by way of the conduit 12.

The operation of the apparatus will now be described with reference to FIG. 1.

In operation, the upper cover member 4 is moved to its upwardmost position while drawing out the shutters 20 from the retractors 22, and a sheet of foamed material 36 is placed in a predetermined position on the table 14.

If desired, the upper cover member 4 may be separated from the plate 8 for enabling the exchange of the plate 8 and the table 14 as a set, for making products of other types. The upper cover member 4 is then moved downward to such a position in which it imparts a slight pressure to the upper surface of the sheet of foamed material 36. The shutters 20 are then retracted into the retractors 22, and the blowers 34 are driven. Air fed by the blowers 34 passes through the pores of the porous member 24 to blow up the fine powdery welding material 38 supplied previously and accumulating on the porous member 24 and oscillating member 26. Thus, the fine powdery welding material 38 is dispersed in the form of a cloud in the hatched zone 40. This fine powdery welding material 38 is supplied automatically into the casing 18 by the material supply conduit 44. During the supply of the fine powdery welding material 38, the handle 28 of the oscillating member 26 is driven to cause oscillation of the oscillating member 26 thereby uniformly distributing the fine powdery welding material 38 which may be supplied non-uniformly. Further, this oscillating member 26 is preferably frequently oscillated at suitable time intervals during the operation so as to ensure uniform distribution of the welding material 38. However, the fine powdery welding material 38 will be sufficiently uniformly distributed by the air supplied by the blowers 34 and passing through the porous member 24 even when the oscillating member 26 may not be actuated frequently in the manner described. The amount of air supplied by the blowers 34 is previously determined so that the upper level of the floating material layer 40 is higher than the upper surface of the pipe 30.

The valve 32 is then opened to supply a jet of gas under high pressure (which may be air under high pressure) from the nozzles of the pipe 30. A part of the fine powdery welding material 38 floating in the floating layer 40 is entrained on the stream gas under high pressure jetted out from the nozzles of the pipe 30 to be carried upward. This fine powdery welding material portion is injected through the apertures 16 of the table 14 into the corresponding areas of the continuous cell structure of the sheet of foamed material 36, and a part thereof is impregnated in the said areas of the cell structure. In this manner, the floating layer 40 or the fine powdery welding material 38 is first formed and then the floating welding material is blown up so that the fine powdery welding material 38 can be quite uniformly dispersed and injected into the cell structure. The amount of the fine powdery material injected into the cell structure and remaining therein can be suitably adjusted by controlling the amount of floated fine powdery material, the pressure of fluid to blow up the fine powdery material, the volume of the fluid and the time of blowing up. The portion of the fine powdery welding material which is not impregnated in the cell structure of the foamed material passes through the apertures 6 of the plate 8 to enter the space 10 of the hollow cover member 4 while being entrained in the air under high pressure. From the space 10, the fine powdery welding material portion is fed by way of the conduit 12 to the welding material collector described later. In this welding material collector, means such as a cyclone is provided to separate the fine powdery welding material from the entraining air under high pressure to collect the welding material.

After the completion of the partial injection or impregnation of the fine powdery welding material into the sheet of foamed material 36 or before starting this operation, air under pressure is directed from the conduit 43 toward the upper surface of the plate 8 to blow away the portion of the fine powdery welding material that may accumulate on the plate 8. The fine powdery welding material portion thus blown away is collected by way of the conduit 12. Repetition of the welding material impregnating operation over a plurality of consecutive times may result in gradual accumulation of the fine powdery welding material on the plate 8, and such accumulating fine powdery welding material may fall down through the apertures 6 of the plate 8 onto the sheet of foamed material 36 to give rise to non-uniform impregnation of the sheet of foamed material 36, with the fine powdery welding material. Such non-uniform impregnation may result in degradation of the quality of the products obtained by welding. The blow-away of the welding material by the air under pressure supplied from the conduit 43 eliminates completely such undesirable degradation of the product quality.

After the process above described, the valve 32 is closed to shut off the gas under high pressure supplied by the pipe 30, and then the shutters 20 are drawn out from the retractors 22 to be placed in the shut-off position. The upper cover member 4 is then moved upward, and the processed sheet of foamed material 36 is taken out of the apparatus. At this time, the blowers 34 may be left in the continuous operating state. This is because, the blowers 34 supplying the wind for forming the floating layer 40 of the fine powdery welding material are not so powerful able to blow the fine powdery welding material in the floating state upward through the apertures 16 of the table 14. Further, the continuous operation of the blowers 34 is preferable in that the shutters 20 and valve 32 may merely be actuated to start the succeeding processing on the next portion of the sheet of foamed material 36. The abovementioned sequence of operations with the mechanism shown in FIG. 1 can be fully automatically controlled as well known in the art.

Figure 2:
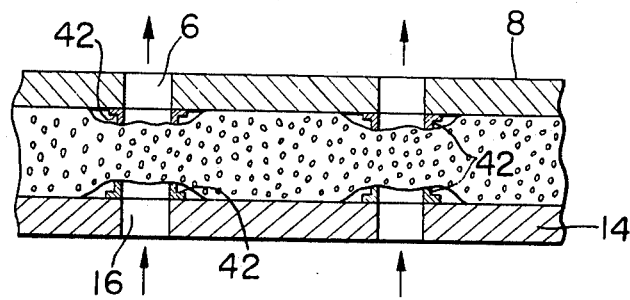
FIG. 2 is an enlarged sectional view of parts of the apparatus shown in FIG. 1.

In the partial impregnation of the sheet of foamed material 36 with the fine powdery welding material, means as shown in FIG. 2 may be preferably employed in order that the portions except the predetermined areas of the sheet of foamed material 36 may not be impregnated with the fine powdery welding material. Referring to FIG. 2, substantially L-shaped pressure imparting members 42 are fixed to the peripheral edges of the apertures 6 of the plates 8 and to the peripheral edges of the apertures 16 of the table 14 to make pressure engagement with the peripheral portions of the desired weld areas of the sheet of foamed material 36 thereby preventing the other portions of the sheet of foamed material 36 from being impregnated with the fine powdery welding material.

Further, in order that the fine powdery welding material may not be sufficiently impregnated in the continuous cell structure of the sheet of foamed material 36 by substantially entirely passing through the cell structure, a suitable fabric layer such as a layer of muslin or calico may be attached to the lower surface of the plate 8 so as to reliably retain the fine powdery welding material in the continuous cell structure of the sheet of foamed material 36. The effect similar to that above described may be obtained when the sheet of foamed material 36 has a backing layer.

Figure 3:
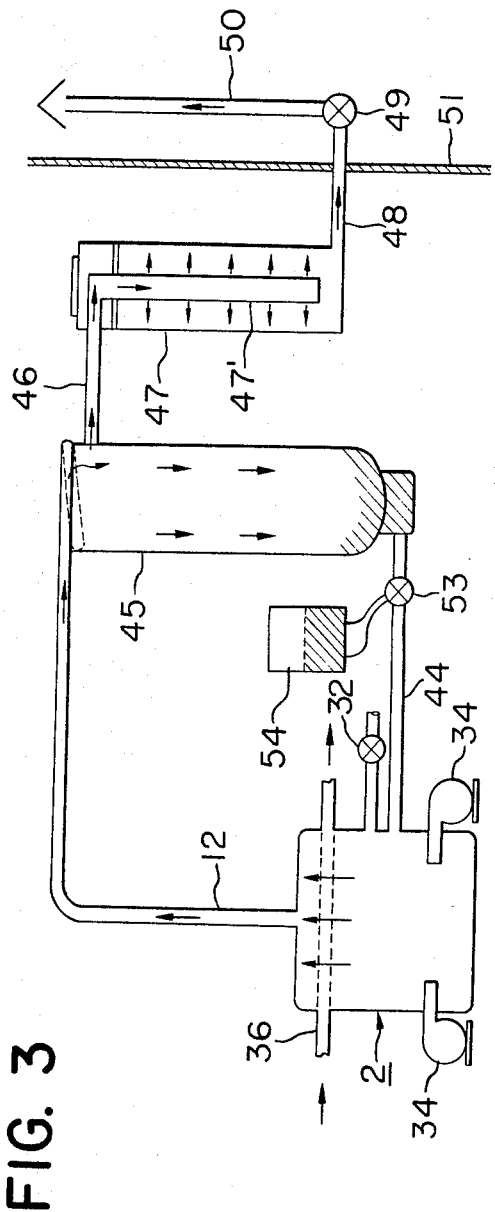
FIG. 3 is a diagrammatic view showing a system for supplying the fine powdery welding material to and collecting the same from the apparatus shown in FIG. 1.

FIG. 3 shows diagrammatically a system used preferably for the collection and supply of the fine powdery welding material. The fine powdery welding material collected by way of the conduit 12 is fed in the form of a gyrating stream into a cyclone 45 from the top thereof. At least 99% of the fine powdery welding material is collected to accumulate on the bottom of the cyclone 45 to be supplied again to the supply conduit 44 by a feed pump 53. A hopper 54 is connected to this feed pump 53 so as to provide a fresh supply of fine powdery welding material. The air entraining thereon the remainder of the fine powdery welding material, which is less than about 1%, together with dust is discharged into a conduit 46 to be introduced into a dust collector 47. A filter 47' is disposed in this dust collector 47 to remove the fine powdery welding material and dust from the air, and the air is fed into a conduit 48 which extends outwardly through the wall 51 of a building to be connected to a suction fan 49. The air is thus discharged to the atmosphere through a stack 50 connected to the suction fan 49.

Figure 4:
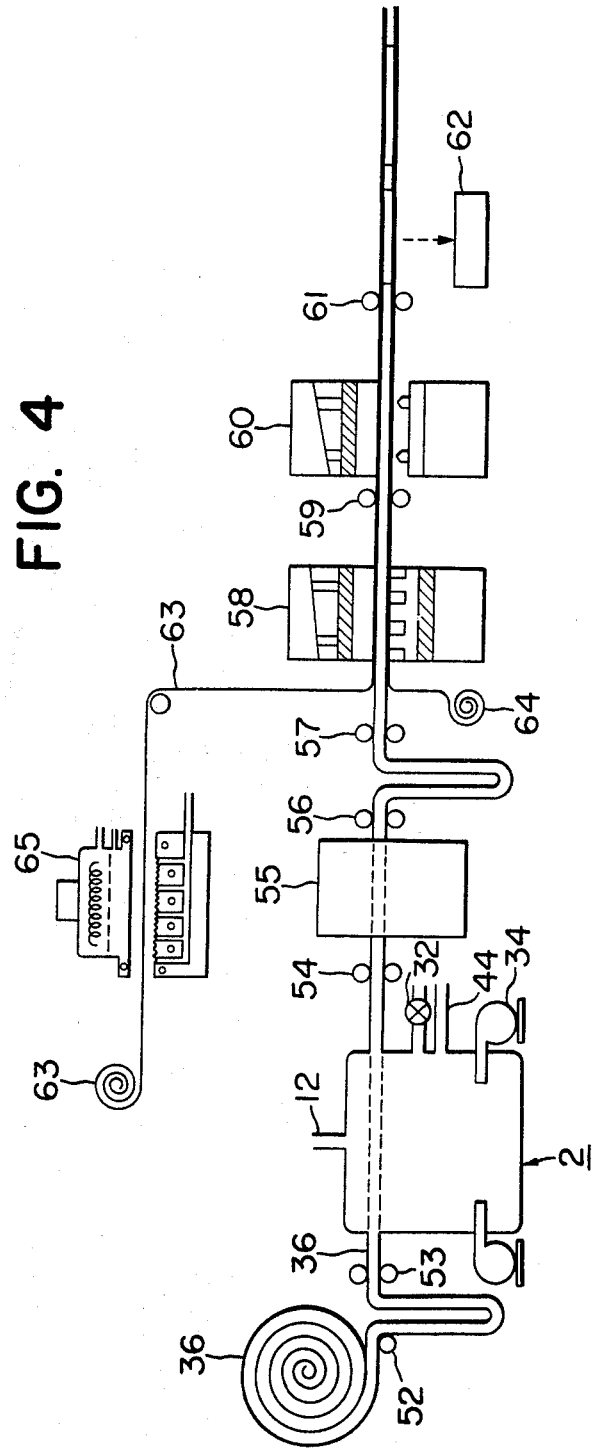
FIG. 4 is a flow sheet of a continuous production line for a seat material using the apparatus shown in FIG. 1.

FIG. 4 shows diagrammatically a continuous production line including an apparatus as shown in FIG. 1. As shown at the left-hand side of FIG. 4, a sheet of foamed material 36 coiled around a roll is fed through rollers 52 and 53 into an impregnating apparatus 2 to be locally impregnated with a fine powdery welding material in a manner as described with reference to FIG. 1. The sheet of foamed material 36 leaving the apparatus 2 is fed past rollers 54 into a heat-setting furnace 55 which includes any suitable heat source, for example, an electric heating means, gas heating means and/or infrared heating means. In this furnace 55, the fine powdery welding material impregnated in the continuous cell structure of the foamed material is lightly heat-set to such an extent that it is sufficiently retained in the continuous cell structure of the foamed material.

The sheet of foamed material 36 leaving the furnace 55 is fed past rollers 56 and 57 into a high frequency welder 58. At a point immediately before the entrance to the high frequency welder 58, a sheet of backing material 64 and a sheet of vinyl coated fabric 63 formed with a required embossed pattern by an embossing apparatus 65 are superimposed on the opposite surfaces respectively of the sheet of foamed material 36, to provide a sandwich structure in which the sheet of foamed material 36 is the core layer. The sheet of vinyl coated fabric 63, the sheet of foamed material 36 and the sheet of backing material 64 constituting the sandwich structure are then welded together in the high frequency welder 58 at the areas impregnated with the fine powdery welding material. At this stage, it is very necessary to align the position of the portions to be welded of the vinyl coated fabric 63, with that of powdery material impregnated portions of the foamed material 36 and that of the welding electrodes of the high frequency welder 58. To this end a pencil beam light apparatus (not shown) is provided with the welder 58. The sheet of vinyl coated fabric 63 and the sheet of backing material 64 may be changed with each other as occasion demands. The unitarily welded sandwich structure is then fed past rollers 59 into a blanking press 60 in which the central portion of the sandwich structure is cut off from the peripheral portions. The product 62 thus obtained is drawn downward after passing through rollers 61. A series of such operations can be carried out in synchronous or timed relation by the use of a feed chain provided with timing needles. More precisely, timing needles are fixed to the shaft portions or ring portions of a feed chain and pierced into predetermined spaced portions of the sheet of foamed material so that the sheet of foamed material can be fed by the feed chain through the individual processing stations at the same rate as the cover sheets. Needless to say, any other suitable synchronous feeding means may be employed in lieu of the timing needles.

In a modification of the continuous production line shown in FIG. 4, the heat-setting apparatus 55 is eliminated, and means for supplying air under positive or negative pressure may be disposed at the outlet of the high frequency welder 58 so as to expel the welding material portion which did not participate in the welding. The welding material portion thus expelled is fed to the collecting means shown in FIG. 3 to be collected.

Figure 5:
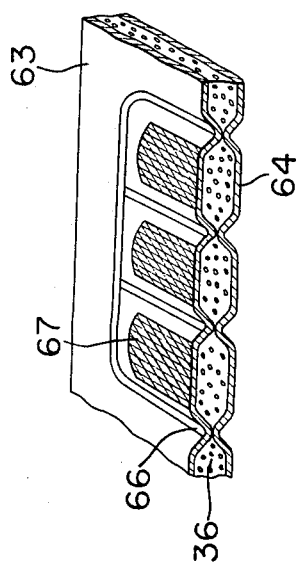
FIG. 5 is a perspective view of the product obtained by the production line shown in FIG. 4.

While FIG. 4 shows a continuous production line in which the starting material is a sheet of foamed material coiled around a roll, a so-called shuttle type production system may also be employed in which the foamed material is previously cut into pieces of desired size to be processed one by one. The product that can be obtained with any one of these systems is shown in FIG. 5. It will be seen in FIG. 5 that a sheet of foamed material 36 is unitarily welded at weld portions 66 to a sheet of vinyl coated fabric 63 having an embossed pattern 67 at its predetermined portion and to a sheet of backing material 64. A plain fabric such as tricot can be used instead of the vinyl coated fabric, as occasion demands.

While preferred embodiments of the present invention have been disclosed in detail herein, it will be appreciated that the present invention is in no way limited to such specific embodiments, and various changes and modifications may be made therein without departing from the spirit of the invention.

What is claimed is:

1. A method of making a cushion material, which comprises the steps of floating fine powdery welding material in a cloud-like layer form, passing a sheet of foamed plastic material over said cloud-like layer of the fine powdery welding material, blowing up said fine powdery welding material from said cloud-like floating layer to be injected into the full thickness of said sheet of foamed material in the predetermined spaced areas thereof, applying a surface material layer and backing material layer on the opposite surfaces of said sheet of foamed material to form a sandwich structure, and then carrying out high frequency welding on the sandwich structure at the areas impregnated with said fine powdery welding material.

2. A method of making a cushion material as claimed in claim 1, which further comprises the step of heating said sheet of spaced area impregnated foamed material prior to the high frequency welding to temporarily heat set the welding material in the inner structure of the foamed plastic material.

3. A method of making a cushion material as claimed in claim 1, wherein some powdery welding material is forced through the sheet of foamed material, and the fine powdery welding material penetrating through the full thickness of said sheet of foamed material is recovered for re-use.

4. A method of making a cushion material as claimed in claim 1, including collecting the portion of said fine powdery welding material which did not participate in the welding by air positive or negative pressure after the step of high frequency welding.

5. A method of making a cushion material, which comprises the steps of impregnating fine powdery welding material into a sheet of foamed plastic material by blowing said fine powdery welding material into the full thickness of said sheet of foamed material in only predetermined spaced areas thereof from one face of said sheet, applying a surface material layer and backing material layer on opposite surfaces of said sheet of foamed material to form a sandwich structure, and then carrying out high frequency welding on the sandwich structure at the spaced areas impregnated with said fine powdery welding material.

6. A method of making a cushion material as claimed in claim 5, wherein some fine powdery welding material penetrates through the full thickness of said sheet of foamed material, and collecting such welding material penetrating through said sheet for re-use.

7. A method of making a cushion material as claimed in claim 5, wherein pressure is applied to said spaced areas of said sheet to aid in impregnating only such areas thereof.

* * * * *